United States Patent [19]
Marquart

[11] Patent Number: 5,992,860
[45] Date of Patent: Nov. 30, 1999

[54] CHUCKING DEVICE FOR MOUNTING A TOOL ON A MACHINE TOOL AND CLAMPING DEVICE FOR THE SHRINK-FIT CLAMPING OF TOOLS

[75] Inventor: Uwe Marquart, Reichenbach, Germany

[73] Assignee: Ingeborg Marquart, Bodman, Germany

[21] Appl. No.: 08/932,697

[22] Filed: Sep. 18, 1997

[30] Foreign Application Priority Data

Sep. 20, 1996 [DE] Germany ............................ 196 38 822

[51] Int. Cl.$^6$ ....................................................... B23B 5/22
[52] U.S. Cl. ........................... 279/102; 279/158; 403/273; 409/239
[58] Field of Search ............................ 403/273; 409/239; 279/102, 158

[56] References Cited

U.S. PATENT DOCUMENTS

| | | | |
|---|---|---|---|
| 3,762,732 | 10/1973 | Speed | 279/158 |
| 4,407,615 | 10/1983 | Kuhlmann | 279/158 |
| 4,652,187 | 3/1987 | Regelsberger et al. | 279/158 |
| 5,280,671 | 1/1994 | Marquart | 279/158 |

FOREIGN PATENT DOCUMENTS 3643651   8/1988   Germany .

Primary Examiner—Andrea L. Pitts
Assistant Examiner—Monica Smith
Attorney, Agent, or Firm—Ostrolenk, Faber, Gerb & Soffen, LLP

[57] ABSTRACT

A chucking device for mounting a tool on a machine tool is provided, having a mounting section for mounting the chucking device on the machine tool and a thermally expandable shrink section which comprises a holding section intended to receive the tool in shrink-fit relationship. A lead-in section is provided at the outer end of the shrink section, whose inner diameter is selected to ensure that the shank of the tool can be placed in the lead-in section and can be centered therein in a cold condition of the shrink section. A suitable rotatably driven mounting intended to receive the chucking device during clamping of the tool is provided, preferably in vertical arrangement, in order to ensure that the shank of the tool will slide into the holding section from above under the action of gravity.

13 Claims, 1 Drawing Sheet

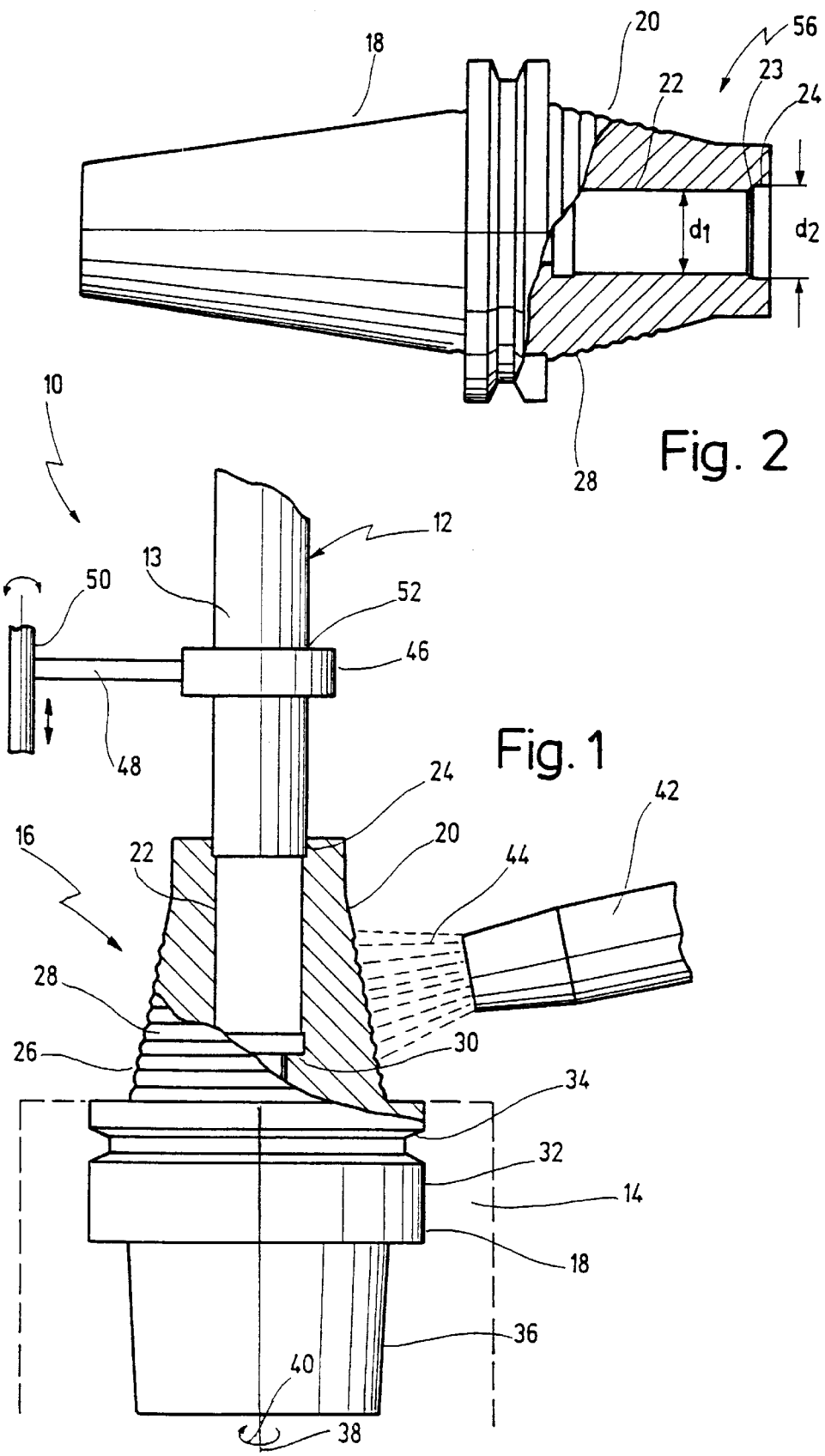

CHUCKING DEVICE FOR MOUNTING A TOOL ON A MACHINE TOOL AND CLAMPING DEVICE FOR THE SHRINK-FIT CLAMPING OF TOOLS

BACKGROUND OF THE INVENTION

The present invention relates to a chucking device for mounting a tool on a machine tool having a mounting section for mounting the chucking device on the machine tool and a thermally expandable shrink section which comprises a holding section intended to receive the tool in shrink-fit relationship.

The invention further relates to a device for the shrink-fit clamping of tools having rotatably driven mounting means adapted to receive such clamping device, and heating means for thermally expanding a shrink section of the chucking device.

RELATED PRIOR ART

A chucking device and a clamping device of the described type are known from U.S. Pat. No. 5,280,671 which is fully incorporated by reference. According to that publication, the tool is clamped in a thermally expandable shrink section of a collet chuck. In order to avoid overheating during the chucking action and to guarantee an especially high clamping force, the collet chuck is located, during the clamping action, in a chucking device which is set in rotation while the shrink section is being thermally expanded from the outside by means of a gas burner. The tool, that is to be placed in the shrink section, is held during that process in a locating bush that is centered relative to the collet chuck by means of countersunk areas in the locating bush provided for that purpose. The locating bush is elastically loaded against the collet chuck so that the tool is pushed directly into the shrink section as soon as the latter has been sufficiently expanded under the action of the heat produced by the gas flame.

Thus, uniform heating is achieved, and any overheating is prevented by the rotary movement of the collet chuck during the process, and by the elastic loading of the tool.

However, it has been found to be relatively costly that different locating bushes must be provided for different tool diameters, which moreover need to be centered relative to the collet chuck into which the tool is to be introduced.

SUMMARY OF THE INVENTION

It is an object of the present invention to improve a collet chuck of the afore-mentioned type so as to simplify the device in which the chucking device is to be placed for thermal shrink fitting. It is a further object of the invention to render the clamping process as simple as possible.

These and other objects are achieved according to the invention by the fact that a chucking device of the afore-mentioned type is provided, at the outer end of the shrink section, with a lead-in section whose inner diameter is selected to ensure that in the cold condition of the shrink section the shank of the tool can be inserted into the lead-in section and can be centered therein.

The object of the invention is perfectly achieved in this way.

According to the invention mounting and centering of the tool shank relative to the shrink section is guaranteed already in the cold condition by the lead-in section provided at the outer end of the shrink section. Thus, it is no longer necessary to center the tool shank while the latter is being clamped in the collet chuck. Moreover, it is no longer necessary to provide different locating bushes for different tool shank diameters.

According to a preferred further development of the invention, the lead-in section is followed by a conical area forming the transition to the holding section.

This further facilitates the insertion of the tool shank into the holding section.

With respect to the device for the shrink-fit clamping of the tool in a collet chuck of the afore-mentioned type the object of the invention is achieved by the fact that the mount for the chucking device is arranged substantially in a vertical direction, which allows the tool shank to be introduced from above, so that the tool shank can slide from the lead-in section into the holding section under the action of gravity as soon as the holding section has been thermally expanded to a sufficient extent.

The structure of the mounting which is preferably rotatably driven is thus considerably simplified according to the invention, there being no need whatever for any additional locating means with a locating bush that must be centered relative to the chucking device.

Also, the shank of the tool to be chucked is simply introduced into the cold lead-in section from above.

Now, the mounting can be set in rotation, and the shrink section can be thermally expanded by the heating means until the shank of the tool comes to slide from the lead-in section into the holding section under the action of gravity.

The clamping device for chucking and unchucking the tool is considerably simplified in this way.

According to an additional further development of the invention an external centering aid is provided above the lead-in section, which may have the shape of a swinging arm with a centering bore provided therein through which the tool shank can be inserted into the lead-in section from above.

It is thereby avoided that the lead-in section has to hold the tool all by itself during rotation of the chucking device. Preferably, the centering bore has a larger clear diameter and merely acts to prevent tilting of the tool shank. The same swinging arm may be provided with several different centering bores for several different shaft diameters, in which case it is merely necessary to swing the correct centering bore into its operative position after the chucking device has been clamped in its mounting.

It should be noted that the before-mentioned features and those to be explained below can be used not only in the respective combinations indicated, but also in other combinations or in isolation, without leaving the context of the present invention.

SHORT DESCRIPTION OF THE DRAWINGS

Further features and advantages will become apparent from the description given below of certain preferred embodiments of the invention with reference to the drawings in which:

FIG. 1 shows a simplified diagrammatic representation of a device according to the invention for chucking the shank of a tool in a chucking device which in its turn is clamped and rotatably driven;

FIG. 2 shows a longitudinal view, partly sectioned, of a chucking device according to the invention with slight modifications as compared with the chucking device of FIG. 1.

DETAILED DESCRIPTION OF THE PREFERRED EMBODIMENTS

In FIG. 1 a device according to the invention is generally indicated by reference numeral 10. A chucking device, generally indicated by 16, is designed as a collet chuck and comprises a mounting section 18 for mounting the device on a machine tool and a shrink section 20 which can be thermally expanded for clamping a tool 12 in shrink-fit relationship. The precise design and size of the mounting section depend on the particular machine tool on which the chucking device 16 is to be used.

In the illustrated example the mounting section 18 comprises a cylindrical section 32 in which an annular groove 34 is provided and which is followed by an outer taper 36.

Similarly, the shape and size of the shrink section 20 depend on the particular design of the tool-holding fixture on the machine tool. In the illustrated example, the shrink section comprises an outer taper 26 with a corrugated surface 28 which is intended to improve the absorption and distribution of heat during heating of the shrink section 20 by means of a gas flame 44 of a heating device 42. The mounting section 20 further comprises a central cylindrical bore that serves as holding section 22 and, together with an axial shoulder 30, forms an abutment for a shank 13 of the tool 12. At its outer end the holding section 22, in which the holding force is produced which later acts on the shrink-fitted tool 12, is followed by a lead-in section 24 whose inner diameter is slightly larger than that of the holding section 24.

In FIG. 1 the difference in diameters has been exaggerated in order to better illustrate the stepped transition.

The inner diameter of the holding section 24 is properly sized to enable the shank 13 of the tool 12 to be introduced from above into the cold lead-in section 24 of the chucking device 16, while being centered in the chucking device 16 at the same time.

In order to facilitate the insertion of the shank 13 into the lead-in section 24, an additional centering aid 46 may be arranged at a sufficient distance from the upper end of the vertically arranged chucking device 16, which centering aid may for example comprise an arm 48 mounted on a swinging axis 50 and provided with a centering bore 52 whose inner diameter is slightly larger than the outer diameter of the shaft 13.

Although this centering aid 46 is not absolutely necessary, it facilitates the quick insertion of the shank 13 into the lead-in section 24, while simultaneously preventing any damage due to tilting or the like. To accommodate different shank diameters 13, several different centering bores may be provided on the same swinging axis and can then simply be swung into the correct position after the chucking device 16 has been clamped in its mounting 14.

In order to clamp the tool 12 in the chucking device 16, once the shank 13 of the tool 12 has been inserted into the lead-in section 24, the mounting 14 is set in rotation about its vertically extending rotary axis 38, as indicated by arrow 40. At the same time, the corrugated surface 28 of the chucking device 16 is heated by the gas flame 44 of the heating means 42. As soon as the mounting section 22 has sufficiently expanded under the action of heat, the shank 13 of the tool 12 slides into the holding section 22 under the action of gravity until it comes to abut against the axial shoulder 30.

Once the chucking device has cooled, it is removed from the mounting 14; to this end, the centering aid 46, if present, is first pulled off the tool 12 in upward direction and is then swung to the side.

For the purpose of removing the tool 12, the entire mounting 14 is pivoted, preferably by 180°, so that, with the shrink section 20 again sufficiently expanded, the tool 13 can drop from the chucking device under the action of gravity and can be caught in a suitable way.

FIG. 2 shows a slightly modified embodiment of the chucking device according to the invention, indicated generally by reference numeral 56. Whenever like parts are used in the two embodiments, they are indicated by the same reference numerals.

Apart from the slightly altered shape of the mounting section 18, the chucking device 16, being again designed as a collet chuck, differs in this case from the chucking device described above with reference to FIG. 1 essentially in that a conical area 23 is provided between the lead-in section 24 and the holding section 22, whereby the transition from the lead-in section 24, which again has an inner diameter $d_2$ slightly larger than the inner diameter $d_1$ of the holding section 22, exhibits a more uniform shape that facilitates the sliding movement into the thermally expanded holding section under the action of gravity.

Here again, the difference in diameters $d_2$–$d_1$ has been exaggerated in FIG. 2 for the sake of improved visibility.

Although the chucking devices illustrated in FIG. 1 and in FIG. 2 both take the form of collet chucks it is understood that the invention is likewise suited to support the clamping of tools in split chucks of the shrink-fit type.

What is claimed is:

1. A clamping device for clamping a tool in a shrink-fit relationship with a machine tool, said clamping device comprising:

a chucking device having a mounting section for mounting the chucking device on said clamping device, said chucking device further including a thermally expandable shrink section having a holding section formed and sized to receive a shank of the tool in a shrink-fit relationship, wherein the shrink section comprises an outer end formed and sized as a lead-in section for receiving and centering the tool shank when said shrink section is not in a thermally expanded condition;

a receiving device for receiving said chucking device in a substantially vertical direction, said receiving section thereby causing said lead-in section to point upwards and receive and center said tool shank within said shrink section under the action of gravity when said shrink section is in a thermally expanded condition; and wherein said lead-in section is sized to release said tool shank and to guide said tool shank into said receiving section when said shrink section is thermally expanded.

2. The clamping device of claim 1, wherein said lead-in section is contiguous to a conical area thereby forming a transition to said holding section from said lead-in section.

3. The clamping device of claim 1, further comprising heating means for thermally expanding said shrink section of said chucking device.

4. The clamping device of claim 1, further comprising means for rotatably driving said chucking device around a longitudinal axis thereof.

5. The clamping device of claim 3, further comprising means for rotatably driving said chucking device around a longitudinal axis thereof.

6. A chucking device for mounting a tool in a tool mounting, said chucking device comprising:

an expandable shrink section expandable between at least an expanded and non-expanded state;

said shrink section having a shrink cavity and a lead-in portion, said lead-in portion having a lead-in cavity;

wherein when said shrink section is in said non-expanded state, said tool fits into said lead-in cavity but not said shrink cavity; and wherein when said shrink section is in said expanded stated, said tool fits into said shrink cavity.

7. The chucking device as claimed in claim 6 wherein said shrink cavity and said lead-in cavity are substantially cylindrical in shape.

8. The chucking device as claimed in claim 6 wherein said shrink section further comprises a conical portion disposed between said lead-in cavity and said shrink cavity.

9. The chucking device as claimed in claim 6 wherein said shrink section is expandable through the application of a heat source.

10. A method of mounting a tool in a tool mounting, said method comprising:

providing a tool mounting have an expandable shrink section, said shrink section being expandable between at least an expanded and non-expanded state and having a lead-in portion;

inserting said tool into said lead-in portion of said tool mounting when said shrink section is in said non-expanded state;

expanding said shrink section; and inserting said tool from said lead-in section into said tool mounting while said shrink section is in said expanded state.

11. The method as claimed in claim 10 wherein said shrink section and said lead-in portion are substantially cylindrical in shape.

12. The method as claimed in claim 10 further comprising expanding said shrink section through applying heat.

13. A clamping device for clamping a tool in a shrink-fit relationship with a machine tool, said clamping device comprising:

a chucking device having a mounting section for mounting the chucking device on said clamping device, said chucking device further including a thermally expandable shrink section having a holding section formed and sized to receive a shank of the tool in a shrink-fit relationship, wherein the shrink section comprises an outer end formed and sized as a lead-in section for receiving and centering the tool shank when said shrink section is not in a thermally expanded condition;

a receiving device for receiving said chucking device; and wherein said lead-in section is sized to release said tool shank and to guide said tool shank into said receiving section when said shrink section is thermally expanded.

\* \* \* \* \*